Figure 3:
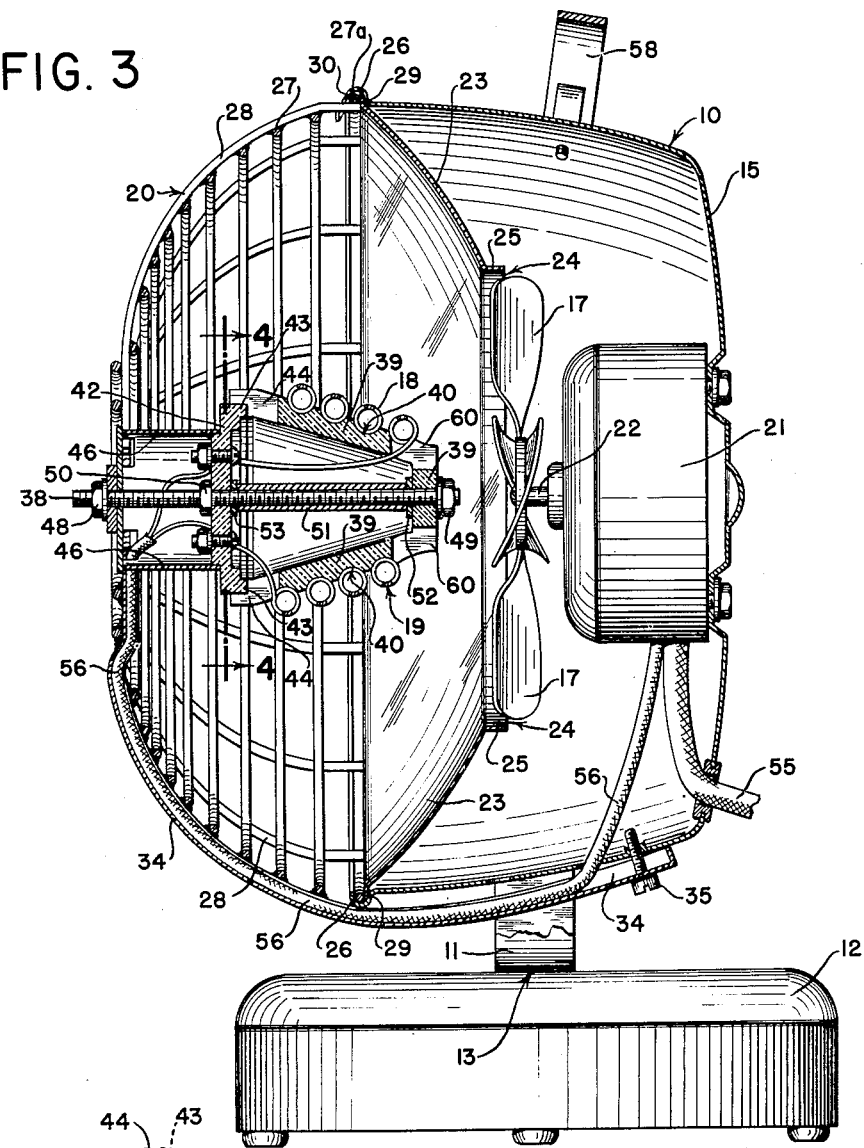

March 10, 1953 — J. M. AUFIERO — 2,631,217
HEATING APPARATUS
Filed Oct. 1, 1951 — 2 SHEETS—SHEET 1
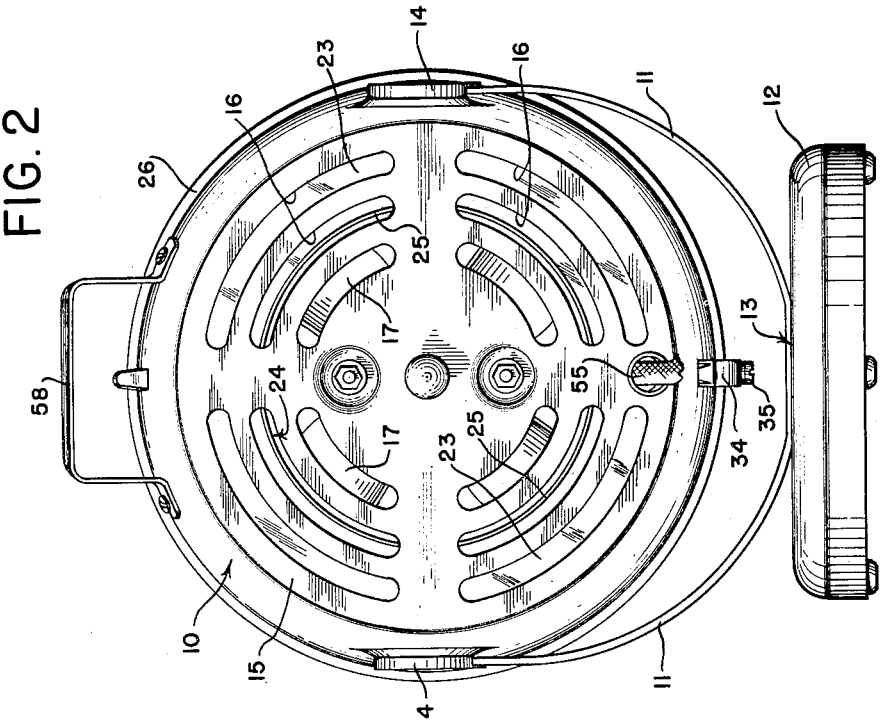
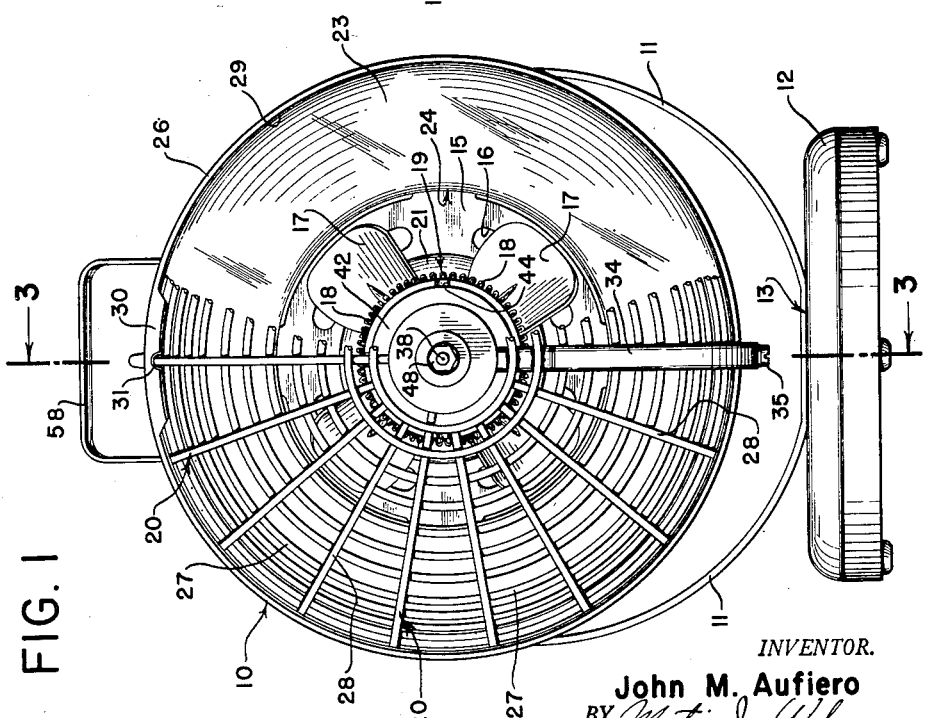
INVENTOR.
John M. Aufiero
BY Martin J. Walter
ATTORNEY INVENTOR.
John M. Aufiero
BY Martin J. Wahn
ATTORNEY Patented Mar. 10, 1953

2,631,217

UNITED STATES PATENT OFFICE 2,631,217

HEATING APPARATUS

John M. Aufiero, Plandome, N. Y.

Application October 1, 1951, Serial No. 249,105

6 Claims. (Cl. 219—39)

The present invention relates to a heating apparatus and more particularly to an electric, auxiliary heating apparatus having means incorporated therein for circulating air to be warmed over the heating elements and then circulating the warm air throughout the space desired to be heated.

It is an object of the present invention to provide an electric heating apparatus which will operate at maximum efficiency and will therefore take maximum advantage of the electrical energy supplied to it.

Heaters of the type here considered, heretofore in use, have been unsatisfactory and inefficient for several reasons. Those which have relied on radiation as the sole means of distributing heat into the area to be warmed have little or no effect outside of the immediate vicinity of the heating apparatus. Where such devices are placed in large rooms, close proximity to the heating apparatus is necessary in order for any warmth to be derived therefrom. In those types of heating apparatus more closely similar to the type here under consideration, that is, those types of heating apparatus which incorporate means for forcing air over the heating element, have been inefficient in use in that the air circulated through the device does not come into contact with the total area of the heating element.

It is therefore the object of the present invention to provide a structure in which the air carried through the heating apparatus will impinge upon and be carried over the entire area of the heating element itself. Devices of the type heretofore in use become very warm, but the heat generated is not carried away from the heating apparatus itself into the area desired to be heated. Thus, while in the immediate vicinity of the heating apparatus the temperature may rise to very extreme degrees, out of this immediate vicinity there is not a sufficient increase in warmth. It has therefore been necessary to provide large units having large capacities to heat rooms of normal size. It is an object of the present invention to overcome this deficiency in devices heretofore in use by providing means to insure that the heat generated by the heating element will be conducted away from the heating apparatus and carried into the space desired to be heated.

An apparatus embodying the present invention distributes heat by radiation as well as by forced convection, thus operating at maximum efficiency, substantially all of the air conducted through the heating apparatus will impinge upon the heating element itself or upon the grill work which is heated by conduction from the heating element. Thus there will be no storing of heat in the heating apparatus itself, but rather a general distribution of warmth throughout the entire space in which a temperature rise is desired.

It is a further object of the present invention to provide means for accommodating the expansion of the parts associated with the heating element to prevent their undergoing unnecessary strains due to this expansion while at the same time holding them firmly in position against any vibration or rotational movement.

It is also an object of the present invention to provide a structure not only highly efficient, but one which is rugged and durable. Moreover, a structure, embodying the present invention, having all the advantages above set forth may be manufactured easily, the assembly thereof being accomplished quickly and with very little labor. Thus, a heating device embodying all the advantages of the present invention may be manufactured very inexpensively.

Figure 4:
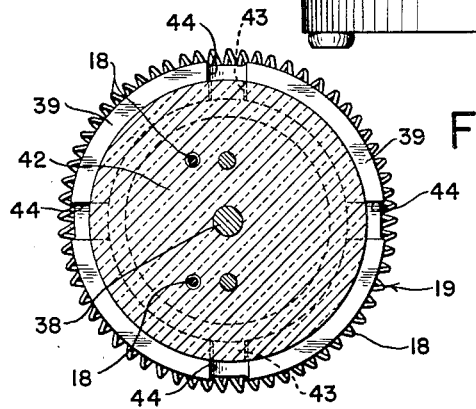

These and other objects and advantages of the present invention will be more readily apparent from the following description and drawing of one specific embodiment thereof. In the drawing:

Fig. 1 is a partially broken away front view of a heating apparatus embodying the present invention, Fig. 2 is a rear view thereof, Fig. 3 is an enlarged sectional view taken along line 3—3 on Fig. 1, and Fig. 4 is an enlarged sectional view taken along the line 4—4 on Fig. 3.

In the particular embodiment of the invention shown in the drawings the casing 10 which forms the principal covering for the apparatus is supported by brackets 11 secured to base 12 at 13. The casing 10 is pivotally mounted to the brackets 11 at 14, thus the casing 10 may be conveniently positioned at any angular position relative to the horizontal base 12.

The back or end covering portion 15 is provided with a plurality of inlet apertures 16 through which air to be warmed may be drawn by fan blades 17 and then forced over the heating coils 18 of the heating element 19 and outwardly into the space to be heated through grill 20.

The fan motor 21 is secured to the back portion 15 of the casing 10 by conventional means and is located in the center of the substantially cylindrically shaped casing 10, thus the shaft 22 of the motor 21 which drives fan blades 17 is coextensive with the central axis of the cylindrically shaped casing 10.

Positioned between the heating element 19 and the fan 17 is a reflector 23. The reflector 23 is concave in shape and acts to reflect radiant heat from the heating coils 18 outwardly from the heating apparatus. The reflector 23 is provided with a central aperture 24, and an inwardly extending flange 25 extends around the periphery of aperture 24. The flange 25 acts as an air direction baffle and insures that all the air drawn in through apertures 16 by fan blades 17 will be carried outwardly through grill 20. As can be seen best in Fig. 3, the flange 25 overlaps the fan blades 17 by a small amount. The casing 10 is provided with an outer channel shaped lip 26 into which the outer flange 29 of the reflector 23 fits.

The grill work 20 comprises a plurality of circular hoops 27 held together by arcuately shaped bars 28. The innermost hoop 27a is also received within channel shaped lip 26. The radius of the hoop 27a is substantially equal to the inner radius of the lip 26, and when inserted into the lip 26 it will be held firmly therein. The width of the lip 26 is substantially equal to the cross sectional diameter of the hoop wire itself, plus the thickness of the outer flange 29 of reflector 23. Thus, when assembled, the grill 20 will, itself, act to hold the reflector 23 firmly seated in position.

The lip 26 is provided with a retaining portion 30. A notch 31 in the retaining portion 30 is large enough to receive one of the radial bars 28 and aids in preventing the grill 20 from rotating within the channel shaped lip 26. A hollow channel bar 34 shaped to conform to the configuration of the grill 20 and casing 10 secures the grill 20 to the casing 10, the channel bar 34 being permanently secured at its outer end to the grill 20 and removably secured to the casing 10 by bolt 35.

The heating element 19 is supported by long threaded member 38 secured at its outer end to the grill 20. The heating element 19 comprises a ceramic insulator 39 and the heating coils 18. The ceramic insulator is frusto-conical in shape and has the smaller end thereof directed towards the fan blades 17. A plurality of grooves 40 are located in the peripheral surface of the ceramic insulator 39. It is within these grooves 40 that the heating coils 18 are held. The grooves act to properly position the coils and prevent their movement relative to one another so that they cannot come into contact with one another causing a short circuit.

A ceramic cover 42 fits into the large end of insulator 39. The cover 42 is provided with small projections 43 which fit into slots or grooves 44 in the insulator 39; thus while the cover 42 cannot move either transversely relative to the insulator 39 or circularly about the longitudinal axis of the insulator it can move a small distance along the direction of said longitudinal axis, the longitudinal axis of the insulator being represented by the threaded member 38. It should be noted that the slots 44 are much larger than the projections 43 leaving ample room for air to flow through the slots 44 as will be more particularly described hereinafter.

Positioned between the ceramic cover 42 and the grill 20 is a metallic heat conductor sleeve 46 which acts to conduct some of the heat generated by the heating coils 18 to the grill 20.

The threaded member 38 which carries the heating element 19 is provided with a nut 48 at the outer end thereof and a nut 49 at the inner end thereof. An intermediate nut 50 clamps the ceramic insulator 39 and cover 42 against the inner nut 49, thus the two nuts 49 and 50 act to hold the ceramic insulator 39 and cover 42 tightly in position on the threaded member 38 clamping the cover 42 against the outer end of metallic sleeve 51. The sleeve 51 encompasses the threaded member 38 and extends from a washer 52 positioned against the inner end surface of the insulator 39 to a washer 53 positioned against the inner surface of the ceramic cover 42.

The sleeve 51 is necessary to accommodate the difference in the amount of expansion between the ceramic insulator 39 and the metallic threaded member 38. When the heating coils 18 are heated, the heat generated will cause the threaded member 38 to expand in a greater amount than the expansion by the ceramic insulator 39. To prevent this expansion from permitting the cover 42 from becoming loose and free to rattle, the metallic sleeve 51 is provided. The sleeve 51 will expand at the same rate as the threaded member 38; thus, the ceramic cover 42 will always be held firmly against the sleeve 51. Expansion on heating will move the ceramic cover 42 outwardly a small amount with the projections 43 sliding within slots 44.

Electrical energy is brought into the device by wire or conductor 55 and is lead to the heating coils 18 by wire 56. As can be noted from Fig. 3 the wire 56 is lead through the hollow channel bar 34.

The casing is provided with a carrying and positioning handle 58 and with a control switch not shown.

In operation the fan motor 21 and the heating coils 18 are activated simultaneously and the coils 18 cannot be activated independently of the fan motor.

The air is drawn in through apertures 16 in the back of casing 10 by fan blades 17 and directed against the heating coils 18. It should be noted that heating coils 18 lying on the surface of the frusto-conical insulator 39 are positioned in staggered relationship with respect to one another and that the smallest end of insulator 39 is nearest the fan blades 17. Thus the air carried through and over the heating element 19 will impinge equally against all of the heating coils 18, insuring maximum operating efficiency by insuring that the maximum amount of heat will be carried away from the heating coils by the air directed against them by fan blades 17.

The insulator 39 is provided at its inner end with a plurality of apertures 60. These apertures permit air to be carried through the interior of the insulator 39 and out through slots 44, carrying away the heat stored within the insulator.

The heat conductor sleeve 46 acts to conduct the heat from the heating element 19 to the grill 20. The grill will thus rise in temperature, but the air flowing through it will carry the heat away from the grill 20 and into the space desired to be heated. It can therefore be seen that heat is imparted to the air in a most efficient manner and substantially all of the heat generated by the heating coils themselves will be carried away by the air flowing through the apertures.

I claim:

1. A heating apparatus comprising a casing, said casing having an air inlet opening and an air outlet opening, a heating element, means to draw air into said casing through said air inlet opening, force it against said heating element, and cause it to flow out of said casing through said air outlet opening, said heating element comprising heating coils, a support member for said heating coils, said support member being constituted of a heat resistant material and being frusto-conical in shape, the axis of said support member being along the line of the flow of the air, and the smaller end of said frusto-conical support member being nearest to said means for forcing the air, said heating coil being positioned in concentric circles about the outer periphery of the slanting sides of said support member, said support member comprising a frusto-conical body portion, said frusto-conical body portion being open at the widest end thereof, and a substantially disk like end covering portion fitting into and overlying said open end of said body portion, said end covering portion being movable axially of said body portion, means to prevent relative rotation between said end covering portion and said body portion about the axis of said body portion, and a metallic connecting member securing together said body portion and said end covering portion.

2. A heating apparatus comprising a casing, said casing having an air inlet opening and an air outlet opening, a heating element, means to draw air into said casing through said air inlet opening, force it against said heating element, and cause it to flow out of said casing through said air outlet opening, said heating element comprising heating coils, a support member for said heating coils, said support member being constituted of a heat resistant material and being frusto-conical in shape, the axis of said support member being along the line of the flow of the air, and the smaller end of said frusto-conical support member being nearest to said means for forcing the air, said heating coil being positioned in concentric circles about the outer periphery of the slanting sides of said support member, said support member comprising a frusto-conical body portion, said frusto-conical body portion being open at the widest end thereof and a substantially disk like end covering portion fitting into and overlying said open end of said body portion, said end covering portion being movable axially of said body portion, means to prevent relative rotation between said end covering portion and said body portion about the axis of said body portion, a metallic threaded member joining together said end covering portion and said body portion and a metallic sleeve having substantially the same coefficient of expansion as said threaded member, said metallic sleeve having one end thereof positioned firmly against the inner surface of the small end of the frusto-conical body portion and the other end thereof positioned firmly against the inner surface of said covering member.

3. A heating apparatus comprising a casing, said casing having an air inlet opening and an air outlet opening, a heating element, means to draw air into said casing through said air inlet opening, force it against said heating element, and cause it to flow out of said casing through said air outlet opening, said heating element comprising heating coils, a support member for said heating coils, said support member being constituted of a heat resistant material and being frusto-conical in shape, the axis of said support member being along the line of the flow of the air, and the smaller end of said frusto-conical support member being nearest to said means for forcing the air, said heating coil being positioned in concentric circles about the outer periphery of the slanting sides of said support member; and a grill covering the outlet opening and a heat conducting sleeve forming a heat conducting connection between said heating element and said grill.

4. A heating apparatus comprising a heating element, a casing, said casing having a plurality of inlet openings at one end thereof and being entirely open the other end thereof, a grill covering said entirely open end and located completely outside of said heating element, means for drawing air into said casing through said inlet openings and forcing said air over said heating element and out through said grill, said heating element having heating coils positioned directly in the path of flow of said air and a heat conducting member joining said heating element and said grill.

5. A heating apparatus comprising a heating element, a casing, said casing having a plurality of inlet openings at one end thereof and being entirely open the other end thereof, a grill covering said open end and located completely outside of said heating element, means for drawing air into said casing through said inlet openings and forcing said air over said heating element and out through said grill, said heating element having heating coils positioned directly in the path of flow of said air, said heating element comprising a hollow support member and heating coils, said hollow support member having an aperture at the inner end thereof adjacent to said means for forcing the air to flow through the apparatus and said support member having an aperture at the outer end thereof adjacent to said grill whereby air will be directed to flow through the interior of said support member.

6. A heating apparatus as claimed in claim 5 including a heat conducting sleeve forming a heat conducting connection between said heating element and said grill, and a heat reflector positioned within said casing between said means for forcing the air and said heating element, and said heat reflector being shaped to reflect the heat generated by said heating element outwardly through said grill.

JOHN M. AUFIERO.

REFERENCES CITED

The following references are of record in the file of this patent:

UNITED STATES PATENTS

| Number | Name | Date |
| --- | --- | --- |
| 1,383,564 | Phillipson | July 5, 1921 |
| 1,674,017 | Marsden | June 19, 1928 |
| 2,334,501 | Moeller | Nov. 16, 1943 |
| 2,523,787 | Spooner, Jr. | Sept. 26, 1950 |